(12) United States Patent
Hsiao et al.

(10) Patent No.: US 12,416,777 B2
(45) Date of Patent: Sep. 16, 2025

(54) OPTICAL SYSTEM

(71) Applicant: TDK TAIWAN CORP., Taoyuan (TW)

(72) Inventors: Yi-Cheng Hsiao, Taoyuan (TW);
Chao-Chang Hu, Taoyuan (TW);
Che-Wei Chang, Taoyuan (TW);
Chen-Hsien Fan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 758 days.

(21) Appl. No.: 17/739,896

(22) Filed: May 9, 2022

(65) Prior Publication Data

US 2022/0357556 A1 Nov. 10, 2022

Related U.S. Application Data

(60) Provisional application No. 63/186,496, filed on May 10, 2021.

(51) Int. Cl.

| | |
|---|---|
| *G02B 7/08* | (2021.01) |
| *G02B 7/00* | (2021.01) |
| *G02B 7/02* | (2021.01) |
| *G02B 7/09* | (2021.01) |
| *G02B 15/14* | (2006.01) |
| *G02B 27/64* | (2006.01) |
| *G03B 3/10* | (2021.01) |
| *G03B 5/02* | (2021.01) |
| *H04N 23/54* | (2023.01) |
| *H04N 23/55* | (2023.01) |

(52) U.S. Cl.
CPC ............. *G02B 7/08* (2013.01); *G02B 7/005* (2013.01); *G02B 7/021* (2013.01); *G02B 7/022* (2013.01); *G02B 7/023* (2013.01); *G02B 7/09* (2013.01); *G02B 15/142* (2019.08); *G02B 27/646* (2013.01); *G03B 3/10* (2013.01); *G03B 5/02* (2013.01); *H04N 23/54* (2023.01); *H04N 23/55* (2023.01); *G03B 2205/0061* (2013.01)

(58) Field of Classification Search
CPC .......... G02B 7/08; G02B 7/005; G02B 7/021; G02B 7/022; G02B 7/023; G02B 7/09; G02B 15/142; G02B 27/646; H04N 23/54; H04N 23/55; G03B 3/10; G03B 5/02; G03B 2205/0061
USPC ....................................................... 359/823
See application file for complete search history.

(56) References Cited

U.S. PATENT DOCUMENTS 5,101,278 A * 3/1992 Itsumi .................. G02B 7/102
348/E5.045

* cited by examiner

*Primary Examiner* — Bumsuk Won
*Assistant Examiner* — Mitchell T Oestreich
(74) *Attorney, Agent, or Firm* — Muncy, Geissler, Olds & Lowe, P.C.

(57) ABSTRACT

An optical system is provided in the present disclosure, including a first movable portion, a fixed portion, a first driving assembly, and a circuit assembly. The first movable portion is connected to a first optical element. The first movable portion is movable relative to the fixed portion. The first driving assembly drives the first movable portion to move relative to the fixed portion. The first movable portion is movably connected to the fixed portion via the circuit assembly.

18 Claims, 9 Drawing Sheets

OPTICAL SYSTEM

CROSS REFERENCE TO RELATED APPLICATIONS

This application claims the benefit of U.S. Provisional Application No. 63/186,496, filed May 10, 2021, the entirety of which is incorporated by reference herein.

BACKGROUND OF THE INVENTION

Field of the Invention

The present disclosure is related to an optical system, and more particularly to an optical system with optical elements that can be adjusted with precision.

Description of the Related Art

As technology has developed, it has become more common to include image-capturing and video-recording functions into many types of modern electronic devices, such as notebook computers, smartphones, and digital cameras. These electronic devices are used more and more often. In addition to the models that have been developed to be more convenient, thin, and lightweight, it is also desirable to provide optical qualities that are better and more stable, offering consumers more choice.

Electronic devices that have image-capturing or video-recording functions normally include one or more lenses, thereby being able to perform such functions as auto focus (AF), zooming, and optical image stabilization (OIS). Therefore, optical systems usually include a plurality of driving assemblies for driving the optical elements to move and a plurality of sensing assemblies for sensing the positions of the optical elements. However, when optical elements (e.g. lenses) are driven to move a long distance, this often leads to problems with tilting or deflection. As a result, the present disclosure provides an optical system that is different from the prior art, to improve the stability by adjusting the positions of the optical elements with great precision, as well as to achieve miniaturization.

BRIEF SUMMARY OF THE INVENTION

In one embodiment of the present disclosure, an optical system is provided, that includes a first movable portion, a fixed portion, a first driving assembly, and a circuit assembly. The first movable portion is connected to a first optical element. The first movable portion is movable relative to the fixed portion. The first driving assembly drives the first movable portion to move relative to the fixed portion. The first movable portion is movably connected to the fixed portion via the circuit assembly.

In some embodiments, the optical system further includes a second movable portion and a second driving assembly. The second movable portion is connected to a second optical element. The second movable portion is movable relative to the fixed portion and the first movable portion. The first movable portion and the second movable portion are arranged in a first direction. The second driving assembly drives the second movable portion to move relative to the fixed portion.

In some embodiments, the first movable portion is movable within a first range of motion relative to the fixed portion. The second movable portion is movable within a second range of motion relative to the fixed portion. The second range of motion is different from the first range of motion. The second movable portion is movable within a third range of motion relative to the first movable portion.

In some embodiments, the optical system further includes a first sensing assembly and a second sensing assembly. The first sensing assembly senses the movement of the first movable portion relative to the fixed portion. The first sensing assembly includes a first reference magnetic element and a first sensor. The first reference magnetic element includes a plurality of first magnetic pole pairs that have N poles and S poles. The first magnetic pole pairs are arranged in the first direction. In each of the first magnetic pole pairs, an N pole and an S pole are arranged in a first magnetic pole direction. The first magnetic pole direction is perpendicular to the first direction. The first sensor corresponds to the first reference magnetic element. The second sensing assembly senses the movement of the second movable portion relative to the first movable portion. The second sensing assembly includes a second reference magnetic element and a second sensor. The second reference magnetic element includes a second magnetic pole pair that have an N pole and an S pole. In the second magnetic pole pair, the N pole and the S pole are arranged in a second magnetic pole direction. The second magnetic pole direction is parallel to the first direction. The second sensor corresponds to the second reference magnetic element. The second sensor is disposed on the circuit assembly.

In some embodiments, in the first direction, the largest size of the second reference magnetic element is smaller than the largest size of the first reference magnetic element.

In some embodiments, the first magnetic pole direction is perpendicular to the second magnetic pole direction.

In some embodiments, when viewed in a second direction that is perpendicular to the first direction, the first reference magnetic element at least partially overlaps the second reference magnetic element, and the first sensor does not overlap the second sensor.

In some embodiments, the optical system further includes a control unit. The control unit has first predetermined information and second predetermined information. The first predetermined information includes the status of a first magnetic field of the first reference magnetic element for each possible location of the first movable portion relative to the fixed portion. The second predetermined information includes the status of a second magnetic field of the second reference magnetic element for each possible location of the second movable portion relative to the first movable portion. The control unit is electrically connected to the first sensor and the second sensor via the circuit assembly. The first sensor outputs a first sensing signal to the control unit, and the second sensor outputs a second sensing signal to the control unit.

In some embodiments, the control unit calculates the position of the first movable portion relative to the fixed portion based on the first sensing signal and the first predetermined information, and calculates the position of the second movable portion relative to the first movable portion based on the second sensing signal and the second predetermined information.

In some embodiments, the optical system further includes a third optical element. The third optical element is fixedly disposed at the fixed portion, and forms an optical unit with the first optical element and the second optical element. The control unit outputs a first driving signal to the first driving assembly based on a first instruction. The first driving assembly drives the first movable portion to move, and changes the focal length of the optical unit, thereby performing the function of zooming. The control unit outputs a second driving signal to the second driving assembly based on a second instruction. The second driving assembly drives the second movable portion to move, and changes the image plane of the optical unit, thereby performing the function of focusing.

In some embodiments, the control unit outputs the first driving signal to the first driving assembly that drives the first movable portion to move before the control unit outputs the second driving signal to the second driving assembly that drives the second movable portion to move, so that the optical system performs the function of zooming before performing the function of focusing.

In some embodiments, the circuit assembly includes a first circuit element. The first circuit element connects the first movable portion and the fixed portion. The first circuit element includes a movable end, a fixed end, and a flexible portion. The movable end is fixedly connected to the first movable portion. The fixed end is fixedly connected to the fixed portion. The movable end is movably connected to the fixed end via the flexible portion.

In some embodiments, the flexible portion has a plate structure.

In some embodiments, the flexible portion includes a first section, a second section, and a third section. The first section extends in a fourth direction. The second section extends in a fifth direction. The third section extends in a sixth direction. The fourth direction is not parallel to the fifth direction. The fifth direction is not parallel to the sixth direction. The sixth direction is not parallel to the fourth direction.

In some embodiments, when the first movable portion is in an initial position relative to the fixed portion, and viewed in a second direction that is perpendicular to the first direction, the first section does not overlap the movable end; the first section at least partially overlaps the fixed end; the second section does not overlap the movable end; and the second section at least partially overlaps the fixed end.

In some embodiments, when the first movable portion is in a first terminal position relative to the fixed portion, and viewed in a second direction that is perpendicular to the first direction, the first section does not overlap the movable end; the first section does not overlap the fixed end; the second section does not overlap the movable end; and the second section does not overlap the fixed end.

In some embodiments, when the first movable portion is in a second terminal position relative to the fixed portion, and viewed in a second direction that is perpendicular to the first direction, the first section at least partially overlaps the movable end; the first section at least partially overlaps the fixed end; the second section does not overlap the movable end; and the second section does not overlap the fixed end.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion. The various embodiments are described with reference to the attached figures, where like reference numerals are used throughout the figures to designate similar or equivalent elements.

DETAILED DESCRIPTION OF THE INVENTION

Figure 1:
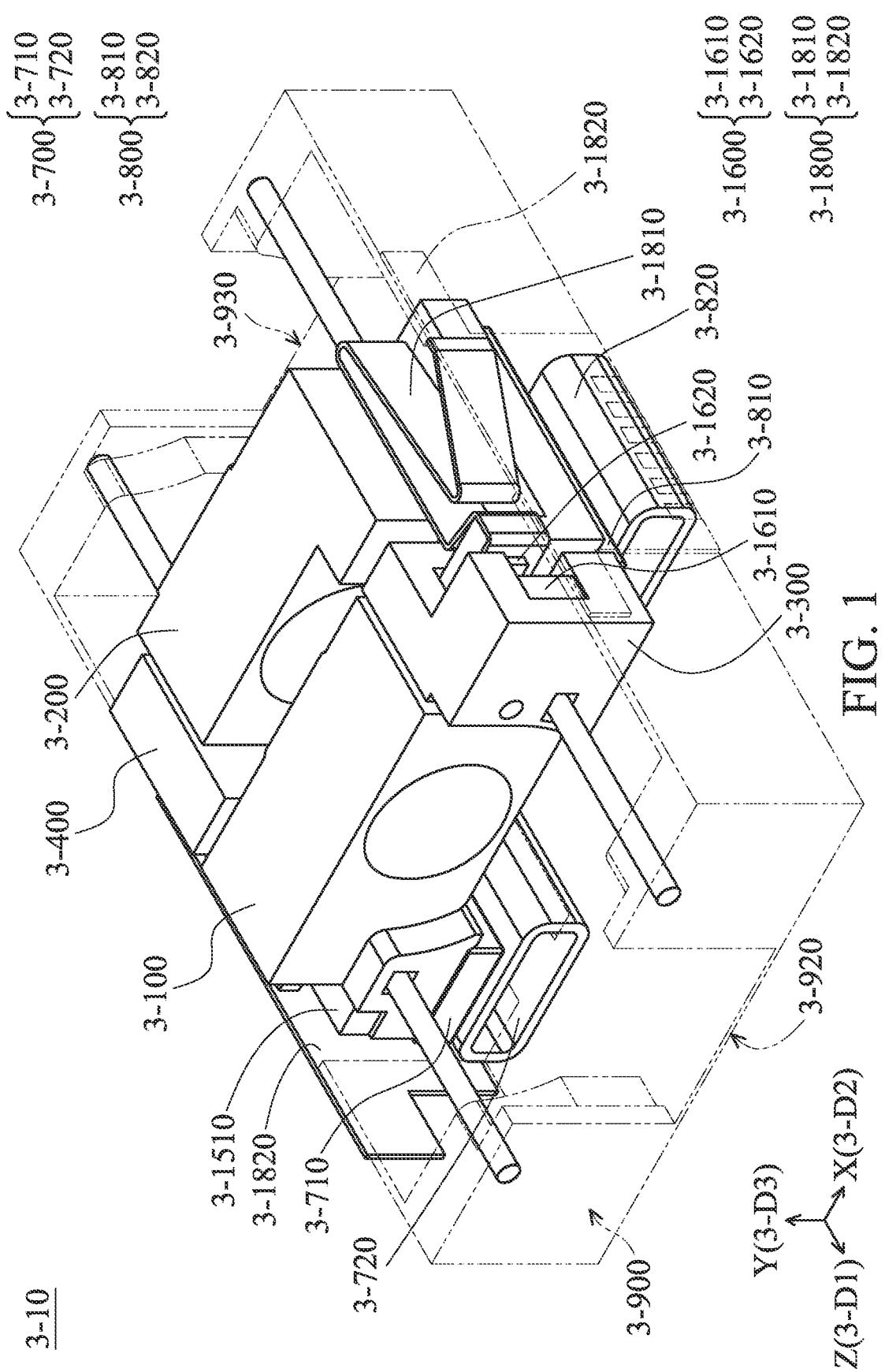
FIG. 1 is a perspective view of the optical system, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

An optical system is provided in the present disclosure, including a plurality of optical elements. These optical elements are movable relative to each other for optical zooming or focusing effects. In some embodiments, during operation, in order to reduce the tilting of optical elements, the first optical element carries the second optical element to move when it does. After the first optical element arrives at the desired position, the second optical element is then finely adjusted, so that the second optical element moves to the desired position. In some embodiments, each of the optical elements in the optical system is connected to a movable portion. Each movable portion is driven to move by a driving assembly (e.g. including a magnetic element and a coil). The position of the movable portion is sensed by a sensing assembly (e.g. including a reference magnetic element and a sensor). In the optical system provided in the present disclosure, one of the movable portions is movably connected to the fixed portion via a flexible circuit assembly. This circuit assembly is also connected to a sensor for sensing the relative motion between the two movable portions. This configuration provides good sensing effects and improves the optical quality of the optical system.

Referring to FIG. 1, FIG. 1 is a perspective view of the optical system 3-10, according to some embodiments of the present disclosure. As shown in FIG. 1, the optical system 3-10 mainly includes a first optical element 3-100, a second optical element 3-200, a first movable portion 3-300, a second movable portion 3-400, a first driving assembly 3-700, a second driving assembly 3-800, a fixed portion 3-900, and a circuit assembly 3-1800. In some embodiments, the first optical element 3-100 and the second optical element 3-200 may each include one or more lenses, forming individual lens groups. In some specific embodiments, the first optical element 3-100 is for optical zooming, and the second optical element 3-200 is for optical focusing. Of course, the functions of the first optical element 3-100 and the second optical element 3-200 may be adjusted or exchanged based on requirements of users. In the embodiment shown in FIG. 1, the first optical element 3-100 is connected to the first movable portion 3-300. The first movable portion 3-300 and the first optical element 3-100 are driven by the first driving assembly 3-700 to move relative to the fixed portion 3-900. Similarly, the second optical element 3-200 is connected to the second movable portion 3-400. The second movable portion 3-400 and the second optical element 3-200 are driven by the second driving assembly 3-800 to move relative to the fixed portion 3-900. It should be noted that the second movable portion 3-400 is movable relative to the first movable portion 3-300, which will be described in details below.

Figure 2:
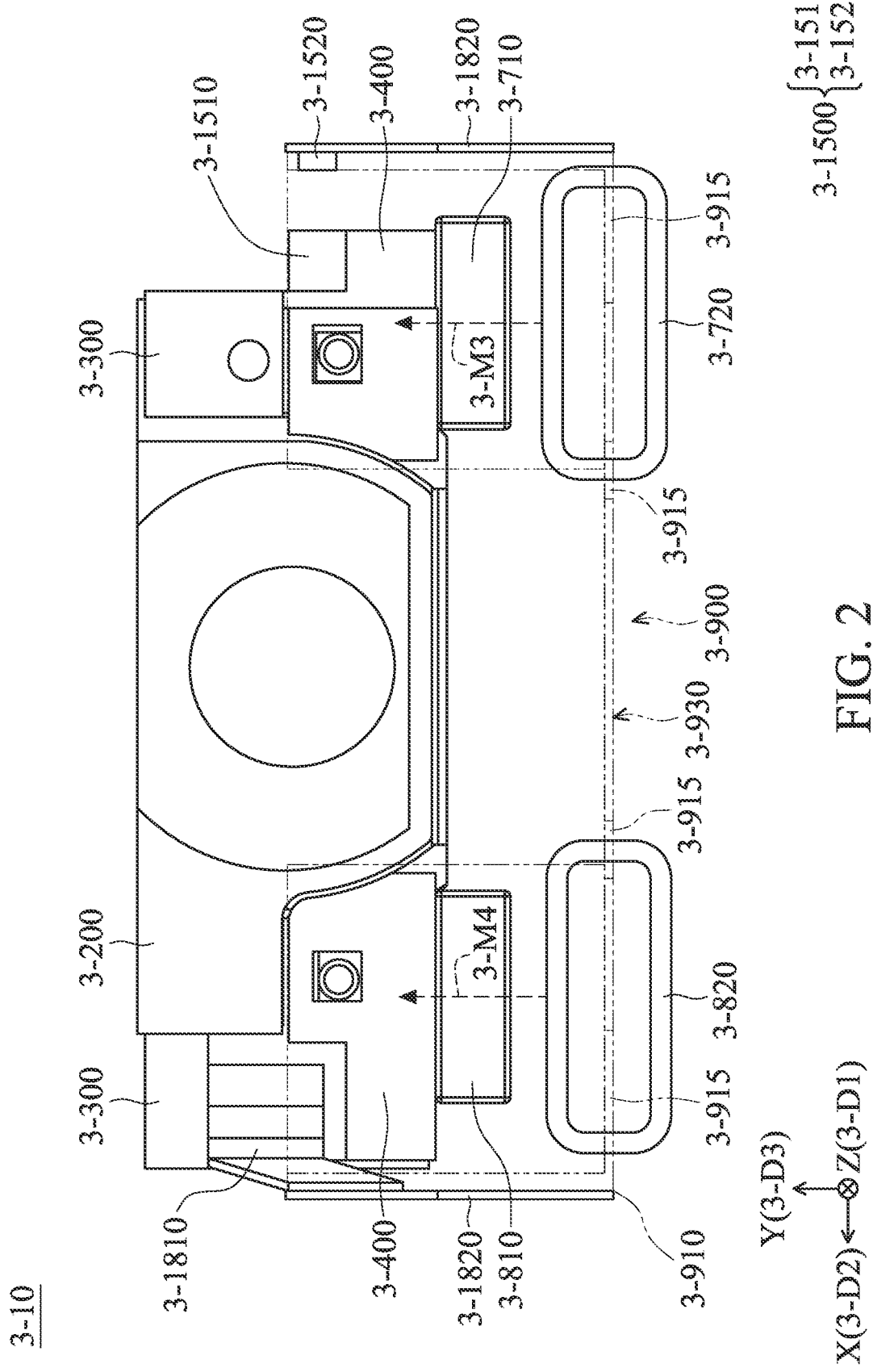
FIG. 2 is a right side view of the optical system, according to some embodiments of the present disclosure.

Next, referring to FIG. 1 and FIG. 2, FIG. 2 is a right side view of the optical system 3-10, according to some embodiments of the present disclosure. As shown in FIG. 2, the first driving assembly 3-700 includes a first magnetic element 3-710 and a first coil 3-720. The first driving assembly 3-700 is at least partially disposed at the first movable portion 3-300. In some embodiments, the first magnetic element 3-710 is fixedly disposed at the first movable portion 3-300. The first coil 3-720 corresponds to the first magnetic element 3-710, and is disposed at the fixed portion 3-900. The first movable portion 3-300 is driven to move relative to the fixed portion 3-900 by the electromagnetic driving force generated between the first magnetic element 3-710 and the first coil 3-720. Similarly, the second driving assembly 3-800 includes a second magnetic element 3-810 and a second coil 3-820. The second driving assembly 3-800 is at least partially disposed at the second movable portion 3-400. In some embodiments, the second magnetic element 3-810 is fixedly disposed at the second movable portion 3-400. The second coil 3-820 corresponds to the second magnetic element 3-810, and is disposed at the fixed portion 3-900. The second movable portion 3-400 is driven to move relative to the fixed portion 3-900 and the first movable portion 3-300 by the electromagnetic driving force generated between the second magnetic element 3-810 and the second coil 3-820.

As shown in FIG. 2, in some embodiments, the fixed portion 3-900 includes a frame 3-910. The first optical element 3-100, the second optical element 3-200, the first movable portion 300, and the second movable portion 3-400 are all disposed within the frame 3-910. The first coil 3-720 and the second coil 3-820 are fixedly disposed at the frame 3-910. In the embodiment shown in FIG. 2, the frame 3-910 has a plurality of openings 3-915. The first coil 3-720 and the second coil 3-820 may 20 through the openings 3-915, and protrude from the frame 3-910. As shown in FIG. 2, the openings 3-915 may have any suitable sizes. For example, the two outer openings 3-915 may be bigger, and the two inner openings 3-915 may be smaller. In some embodiments, the frame 3-910 has a magnetic permeable material. In some specific embodiments, the frame 3-910 is made of a metal material.

Figure 3:
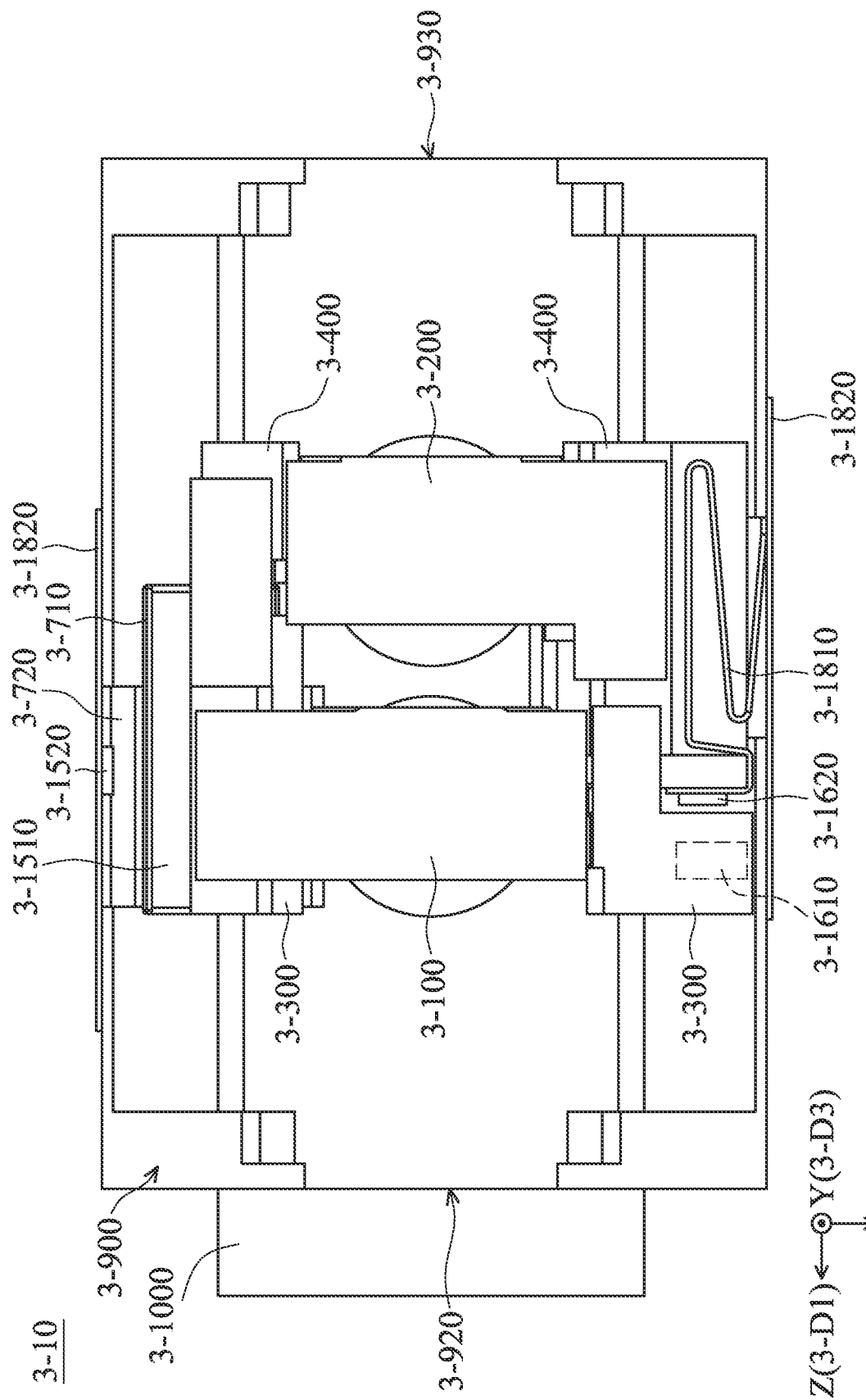
FIG. 3 is a top view of the optical system, according to some embodiments of the present disclosure.

Referring to FIG. 3, FIG. 3 is a top view of the optical system 3-10, according to some embodiments of the present disclosure. In the present disclosure, the first movable portion 3-300 and the second movable portion 3-400 are arranged in the first direction 3-D1. The first movable portion 3-300 and the second movable portion 3-400 are movable in the first direction 3-D1 relative to the fixed portion 3-900. Referring to FIG. 3, when the first movable portion 3-300 moves to the left until the first movable portion 3-300 is in contact with the fixed portion 3-900, the first movable portion 3-300 is at a first terminal position; when the first movable portion 3-300 carries the second movable portion 3-400 to move to the right together until the second movable portion 3-400 is in contact with the fixed portion 3-900, and the first movable portion 3-300 keeps moving to the right until the first movable portion 3-300 abuts against the second movable portion 3-400, the first movable portion 3-300 is at a second terminal position. The range of motion for the first movable portion 3-300 between the first terminal position and the second terminal position is defined as the first range of motion. The first movable portion 3-300 is movable relative to the fixed portion 3-900 within the first range of motion. When the first movable portion 3-300 is at the first terminal position, and the second movable portion 3-400 keeps moving to the left until the second movable portion 3-400 abuts against the first movable portion 3-300, the second movable portion 3-400 is at a third terminal position; when the first movable portion 3-300 carries the second movable portion 3-400 to move to the right together until the second movable portion 3-400 is in contact with the fixed portion 3-900, the second movable portion 3-400 is at a fourth terminal position. The range of motion for the second movable portion 3-400 between the third terminal position and the fourth terminal position is defined as the second range of motion. The second movable portion 3-400 is movable relative to the fixed portion 3-900 within the second range of motion. The first range of motion and the second range of motion are different. In some embodiments of the present disclosure, the second movable portion 3-400 is movable relative to the first movable portion 3-300. When the second movable portion 3-400 moves to the left relative to the first movable portion 3-300 until the second movable portion 3-400 abuts against the first movable portion 3-300, the second movable portion 3-400 is at a fifth terminal position; when the second movable portion 3-400 moves to the right relative to the first movable portion 3-300 until the second t lovable portion 3-400 abuts against the first movable portion 3-300, the second movable portion 3-400 is at a sixth terminal position. The range of motion for the second movable portion 3-400 between the fifth terminal position and the sixth terminal position is defined as the third range of motion. The second movable portion 3-400 is movable relative to the first movable portion 3-300 within the third range of motion. In some embodiments, the first range of motion is smaller than the second range of motion, and the third range of motion is smaller than the first range of motion.

In addition, according to some embodiments of the present disclosure, the fixed portion 3-900 includes a light entrance 3-920 and a light exit 3-930. Lights enter the optical system 3-10 through the light entrance 3-920, and leave the optical system 3-10 through the light exit 3-930. In some embodiments, the optical system 3-10 further includes a third optical element 3-1000. The third optical element 3-1000 may include one or more lenses, forming an individual lens group. The third optical element 3-1000 may be fixedly disposed at the fixed portion 3-900. In the embodiment shown in FIG. 3, the third optical element 3-1000 is disposed on the side where the light entrance 3-920 of the fixed portion 3-900 is. However, in some other embodiments, the third optical element 3-1000 may also be disposed on the side where the light exit 3-930 is. Alternatively, one third optical element 3-1000 may be disposed respectively on the light entrance 3-920 and on the light exit 3-930. The third optical element 3-1000 may form an optical unit with the first optical element 3-100 and the second optical element 3-200, for determining the optical effects of the optical system 3-10.

Referring to FIG. 3, in some embodiments according to the present disclosure, the optical system 3-10 further includes a first sensing assembly 3-1500 and a second sensing assembly 3-1600. The first sensing assembly 3-1500 is for sensing the movement of the first movable portion 3-300 relative to the fixed portion 3-900, and the second sensing assembly 3-1600 is for sensing the movement of the second movable portion 3-400 relative to the first movable portion 3-300. The first sensing assembly 3-1500 and the second sensing assembly 3-1600 may be any suitable position sensing assemblies, such as a Hall sensor, a Tunneling Magnetoresistance (TMR) effect sensor, a Giant Magnetoresistance (GMR) effect sensor, or any magnetic sensors.

In some embodiments, the first sensing assembly 3-1500 includes a first reference magnetic element 3-1510 and a first sensor 3-1520, in some embodiments, the first reference magnetic element 3-1510 is fixedly disposed at the first movable portion 3-300. In some embodiments, the first sensor 3-1520 is fixedly disposed at the fixed portion 3-900, and corresponds to the first reference magnetic element 3-1510. In addition in some embodiments, the largest size of the first reference magnetic element 3-1510 in the first direction 3-D1 is smaller than the largest size of the first magnetic element 3-710 in the first direction 3-D1.

In some embodiments, the second sensing assembly 3-1600 includes a second reference magnetic element 3-1610 and a second sensor 3-1620. In some embodiments, the second reference magnetic element 3-1610 is fixedly disposed at the first movable portion 3-300. In some embodiments, the second sensor 3-1620 is fixedly disposed at the second movable portion 3-400, and corresponds to the second reference magnetic element 3-1610. In addition, in some embodiments, the largest size of the second reference magnetic element 3-1610 in the first direction 3-D1 is smaller than e largest size of the second magnetic element 3-810 in the first direction 3-D1. Moreover, in some embodiments, since the first magnetic element 3-710 and the second magnetic element 3-810 share the same size, the largest size of the second reference magnetic element 3-1610 in the first direction 3-D1 is smaller than the largest size of the first magnetic element 3-710 in the first direction 3-D1 as well. It should be noted that the second sensing assembly 3-1600 is for sensing the relative position between the first movable portion 3-300 and the second movable portion 3-400. Therefore, in some other embodiments, the locations of the second reference magnetic element 3-1610 and the second sensor 3-1620 may be exchanged. For example, the second reference magnetic element 3-1610 may be fixedly disposed at the second movable portion 3-400, while the second sensor 3-1620 may be fixedly disposed at the first movable portion 3-300, In the embodiment shown in FIG. 3, the second sensor 3-1620 is disposed at the second movable portion 3-400, and is electrically connected to the first circuit element 3-1810 that s connected to the second movable portion 3-400.

Figure 4:
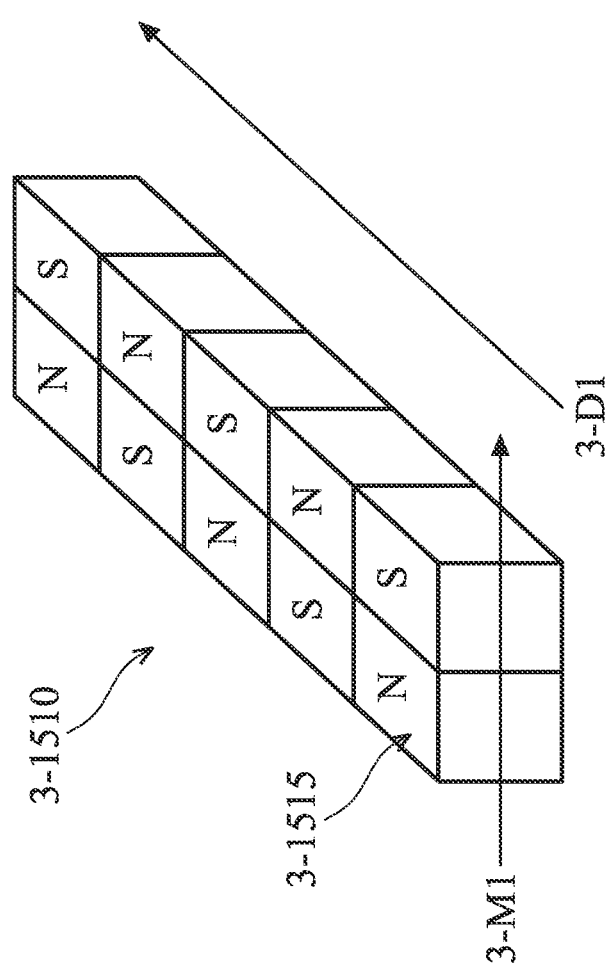
FIG. 4 is a schematic view of the structure of the first reference magnetic element, according to some embodiments of the present disclosure.

Referring to FIG. 4, FIG. 4 is a schematic view of the structure of the first reference mimetic element 3-1510, according to some embodiments of the present disclosure. As shown in FIG. 4, the first reference magnetic element 3-1510 includes a plurality of first magnetic pole pairs 3-1515 that have N poles and S poles. Each of the first magnetic pole pairs 3-1515 includes a pair of magnetic poles consisting of an N pole and an S pole. The plurality of the first magnetic pole pairs 3-1515 are arranged in the first direction 3-D1. In each of the first magnetic pole pairs 3-1515, the N pole and the S pole are arranged in a first magnetic pole direction 3-M1. In this embodiment, the first magnetic pole direction 3-M1 is perpendicular to the first direction 3-D1. When viewed in the first magnetic pole direction 3-M1, the first reference magnetic element 3-1510 and the first sensor 3-1520 at least partially overlap. It should be noted that the first magnetic element 3-710 that is located on the same side as the first reference magnetic element 3-1510 also has a pair of magnetic poles consisting of an N pole and an S pole. The direction that this pair of N pole and S pole are arranged in is defined as the third magnetic pole direction 3-M3 (see FIG. 2). In some embodiments, the first magnetic pole direction 3-M1 and the third magnetic pole direction 3-M3 are not parallel. When viewed in third magnetic pole direction 3-M3 the first magnetic element 3-710 at least partially overlaps the first reference magnetic element 3-1510.

Figure 5:
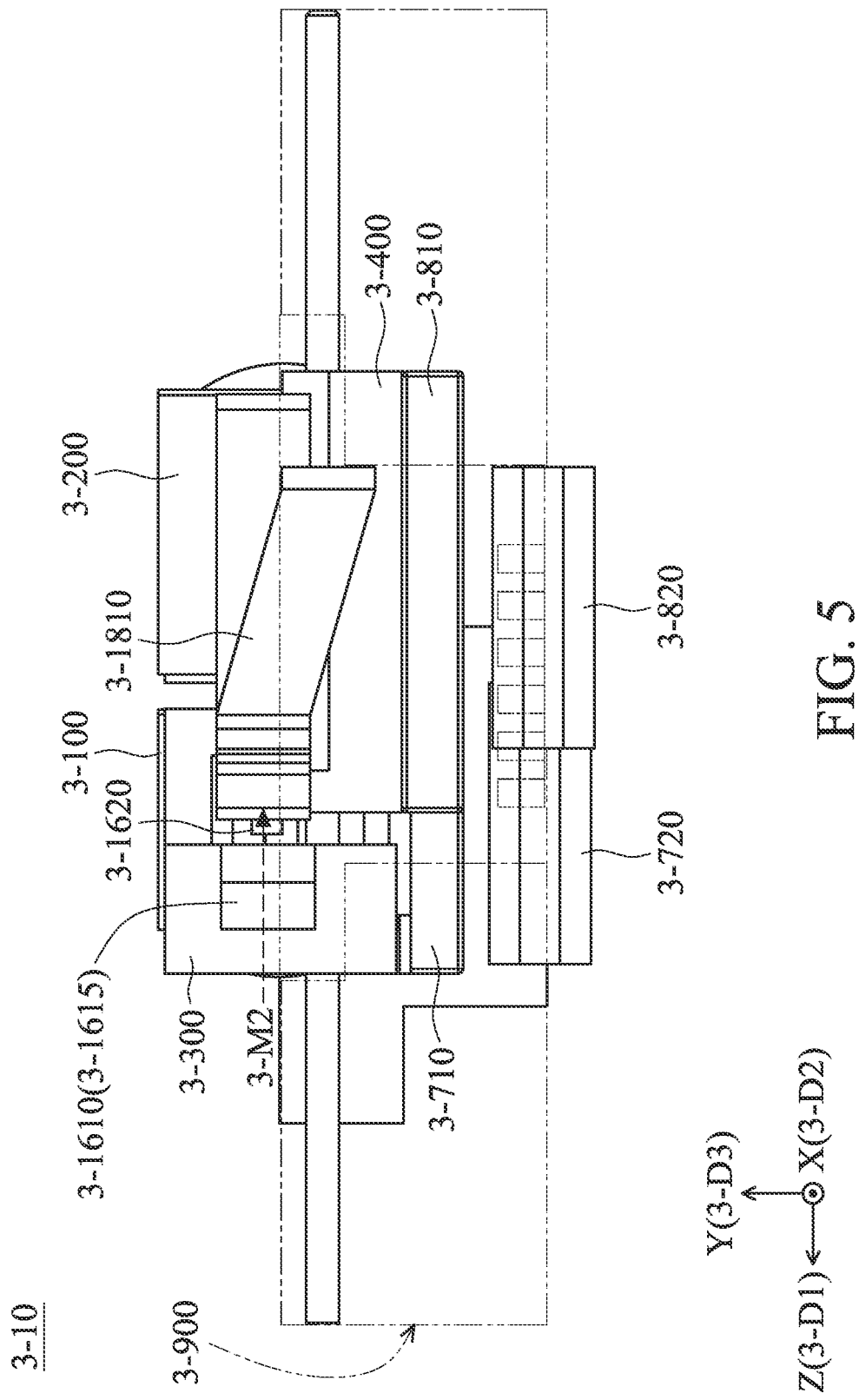
FIG. 5 is a front view of the optical system, according to some embodiments of the present disclosure.

Referring to FIG. 5, FIG. 5 is a front view of the optical system 3-10, according to some embodiments of the present disclosure. As shown in FIG. 5, the second reference magnetic element 3-1610 includes a second magnetic pole pair 3-1615 that have an N pole and an S pole. In the second magnetic pole pair 3-1615, the N pole and the S pole are arranged in a second magnetic pole direction 3-M2. In this embodiment, the second magnetic pole direction 3-M2 is parallel to the first direction 3-D1. It should be noted that the second magnetic element 3-810 that is located on the same side as the second reference magnetic element 3-1610 also has a pair of magnetic poles consisting of an N pole and an S pole. The direction that this pair of N pole and S pole are arranged in is defined as the fourth magnetic pole direction 3-M4 (see FIG. 2). In some embodiments, the second magnetic pole direction 3-M2 and the fourth magnetic pole direction 3-M4 are not parallel. When viewed in the fourth magnetic pole direction 3-M4, the second magnetic element 3-810 does not overlap the second reference magnetic element 3-1610.

In some embodiments, in the first direction 3-D1, the largest size of the second reference magnetic element 3-1610 is smaller than the largest size of the first reference magnetic element 3-1510. In some embodiments, the first magnetic direction 3-M1 is not parallel to the second magnetic direction 3-M2. More specifically, in some embodiments, the first magnetic direction 3-M1 is perpendicular to the second magnetic direction 3-M2. In some embodiment, the third magnetic direction 3-M3 is parallel to the fourth magnetic direction 3-M4. In these embodiments, since the first magnetic direction 3-M1 is not parallel to the third magnetic direction 3-M3, it is not parallel to the fourth magnetic direction 3-M4 as well. In turn, since the second magnetic direction 3-M2 is not parallel to the fourth magnetic direction 3-M4, it is not parallel to the third magnetic direction 3-M3 as well. It should be noted that the magnetic directions that are not parallel to each other may prevent the magnetic interferences between the driving assemblies and the sensing assemblies, and improve the stability of the mechanism.

In some embodiments, when viewed in the second direction 3-D2 that is perpendicular to the first direction 3-D1, the first reference magnetic element 3-1510 at least partially overlaps the second reference magnetic element 3-1610. In some embodiments, when viewed in the second direction 3-D2, the first sensor 3-1520 does not overlap the second sensor 3-1620.

Figure 6:
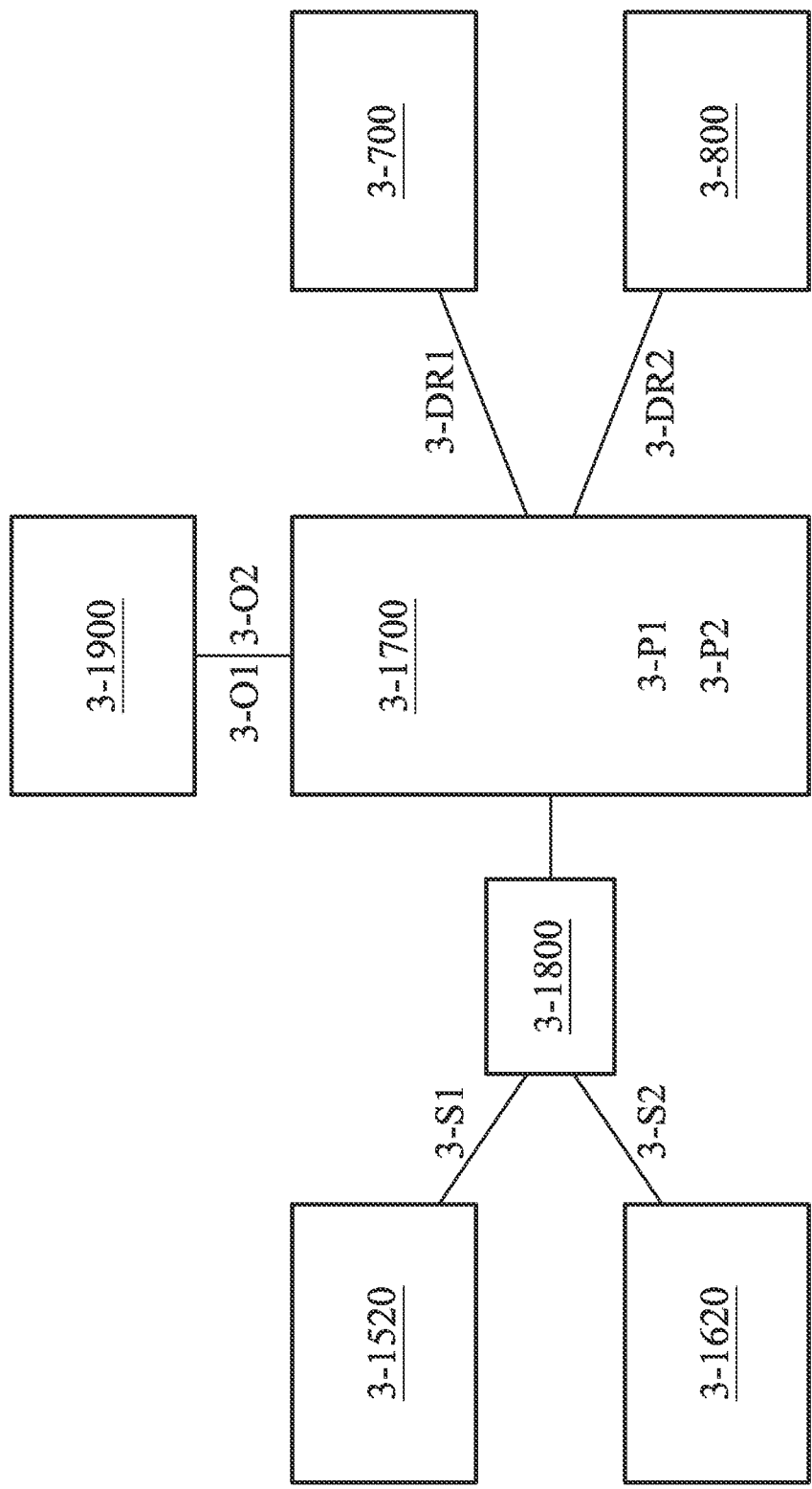
FIG. 6 is a schematic view of the connection of the control unit of the optical system, according to some embodiments of the present disclosure.

Referring to FIG. 6, FIG. 6 is a schematic view of the connection of the control unit 3-1700 of the optical system 3-10, according to some embodiments of the present disclosure. In some embodiments, the optical system 3-10 further includes a control unit 3-1700. The control unit 3-1700 has first predetermined information 3-P1 and second predetermined information 3-P2. The first predetermined information 3-P1 includes the status of a first magnetic field of the first reference magnetic element 3-1510 for each possible location of the first movable portion 3-300 relative to the fixed portion 3-900. The second predetermined information 3-P2 includes the status of a second magnetic field of the second reference magnetic element 3-1610 for each possible location of the second movable portion 3-400 relative to the first movable portion 3-300. The control unit 3-1700 is electrically connected to the first sensor 3-1520 and the second sensor 3-1620 via the circuit assembly 3-1800. The first sensor 3-1520 outputs a first sensing signal 3-S1 to the control unit 3-1700, and the second sensor 3-1620 outputs a second sensing signal 3-S2 to the control unit 3-1700. After the control unit 3-1700 receives the first sensing signal 3-S1 and the second sensing signal 3-S2, it may calculate the position of the first movable portion 3-300 relative to the fixed portion 3-900 based on the first sensing signal 3-S1 and the first predetermined information 3-P1, and calculate the position of the second movable portion 3-400 relative to the first movable portion 3-300 based on the second sensing signal 3-S2 and the second predetermined information 3-P2.

Based on the calculated position(s) of the first movable portion 3-300 and/or the second movable portion 3-400, an external controller 3-1900 may output a first instruction 3-O1 and/or a second instruction 3-O2 to the control unit 3-1700. The control unit 3-1700 may output a first driving signal 3-DR1 to the first driving assembly 3-700 based on the first instruction 3-O1, driving the first movable portion 3-300 to move. In some embodiments, the movement of the first movable portion 3-300 may change the focal length of the optical unit (e.g. including the first optical 100, the second optical element 3-200, and the first movable portion 3-300), so that the optical system 3-10 performs the function of zooming. The control unit 3-1700 may output a second driving signal 3-DR2 to the second driving assembly 3-800 based on the second instruction 3-O2, driving the second movable portion 3-400 to move. In some embodiments, the movement of the second movable portion 3-400 may change the image plane of the optical unit, so that the optical system 3-10 performs the function of focusing.

In some embodiments, first, the control unit 3-1700 outputs the first driving signal 3-DR1 to the first driving assembly 3-700. After the first driving assembly 3-700 drives the first movable portion 3-300 to move, and after the first movable portion 3-300 arrives at its desired position, the control unit 3-1700 then outputs the second driving signal 3-DR2 to the second driving assembly 3-800, so that the second driving assembly 3-800 drives the second movable portion 3-400 to move to its desired position. In other words, the control unit 3-1700 may control the optical system 3-10 to perform zooming before focusing. This precise control of positions may achieve better optical effects.

Figure 7:
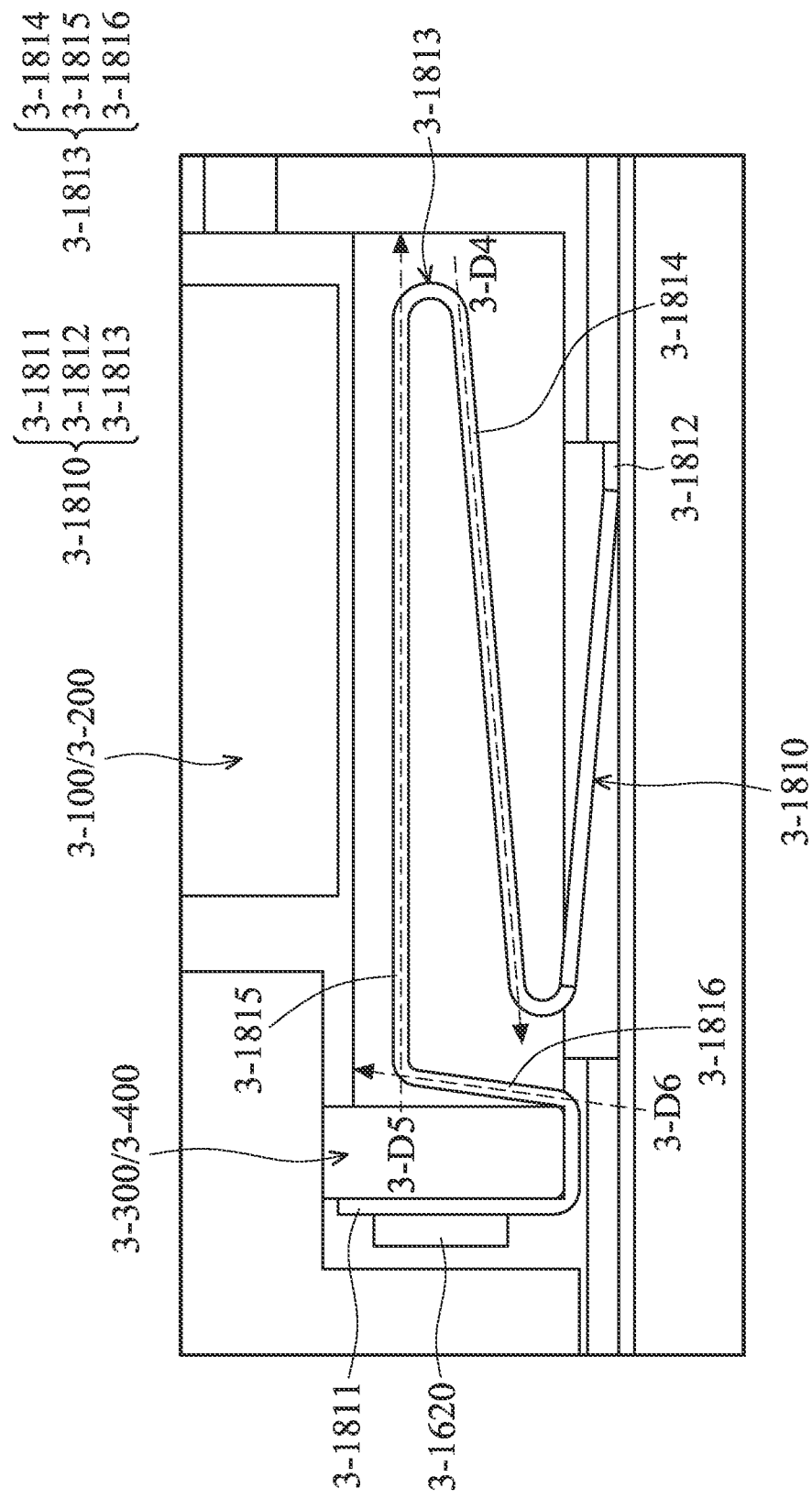
FIG. 7 is a partial zoomed-in top view of the circuit assembly of the optical system, according to some embodiments of the present disclosure.

FIG. 7 is a partial zoomed-in top view of the circuit assembly 3-1800 of the optical system 3-10, according to some embodiments of the present disclosure. Referring to FIG. 1 and FIG. 7, in some embodiments, the circuit assembly 3-1800 may include a first neat 3-1810 and a second circuit element 3-1820. The first circuit element 3-1810 connects the first movable portion 3-300 and the fixed portion 3-900. It should be noted that, in some embodiments, the first circuit element 3-1810 may also be used to connect the second movable portion 3-400 and the fixed portion 3-900, as shown in FIG. 7. The first movable portion 3-300 or the second movable portion 3-400 may be movably connected to the fixed portion 3-900 via the first circuit element 3-1810 of the circuit assembly 3-1800, When viewed in the second direction 3-D2, the first circuit element 3-1810 partially overlaps the first optical element 3-100 and the second optical element 3-200. The second circuit element 3-1820 is disposed on the lateral sides of the frame 3-910 of the fixed portion 3-900. The second circuit element 3-1820 may be electrically connected to the first driving assembly 3-700, the second driving assembly 3-800, and the first sensing assembly 3-1500, etc. The second circuit element 3-1820 may also be electrically connected to the second sensing assembly 3-1600 through the first circuit element 3-1810, for supplying electric powers.

As shown in FIG. 7, the circuit element 3-1810 may include a movable end 3-1811, a fixed end 3-1812, and a flexible portion 3-1813. The movable end 3-1811 is fixedly connected to the second movable portion 3-400 (or the first movable portion 3-300). The fixed end 3-1812 is fixedly connected to the fixed portion 3-900. The movable end 3-1811 is movably connected to the fixed end 3-1812 via the flexible portion 3-1813. In some embodiment, the second sensor 3-1620 of the second sensing assembly 3-1600 may be disposed at the movable end 3-1811, and may be electrically connected to the movable end 3-1811.

As shown in FIG. 1, the flexible portion 3-1813 has a plate structure. Referring to FIG. 7, the flexible portion 3-1813 includes a first section 3-1814, a second section 3-1815, and a third section 3-1816. The first section 3-1814 extends in a fourth direction 3-D4. The second section 3-1815 extends in a fifth direction 3-D5. The third section 3-1816 extends in a sixth direction 3-D6. In the embodiment shown in FIG. 7, the fifth direction 3-D5 may be substantially parallel to the first direction 3-D1. The fourth direction 3-D4 is not parallel to the fifth direction 3-D5, The fifth direction 3-D5 is not parallel to the sixth direction 3-D6. The sixth direction 3-D6 is not parallel to the fourth direction 3-D4.

Figure 8A:
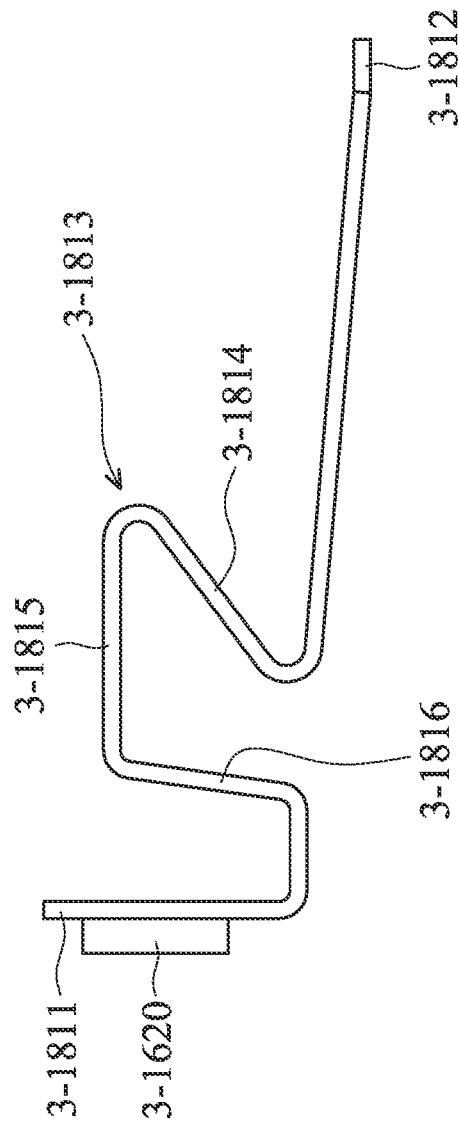
FIG. 8A shows a schematic view of the circuit assembly of the optical system in the first terminal position, according to some embodiments of the present disclosure.
Figure 8B:
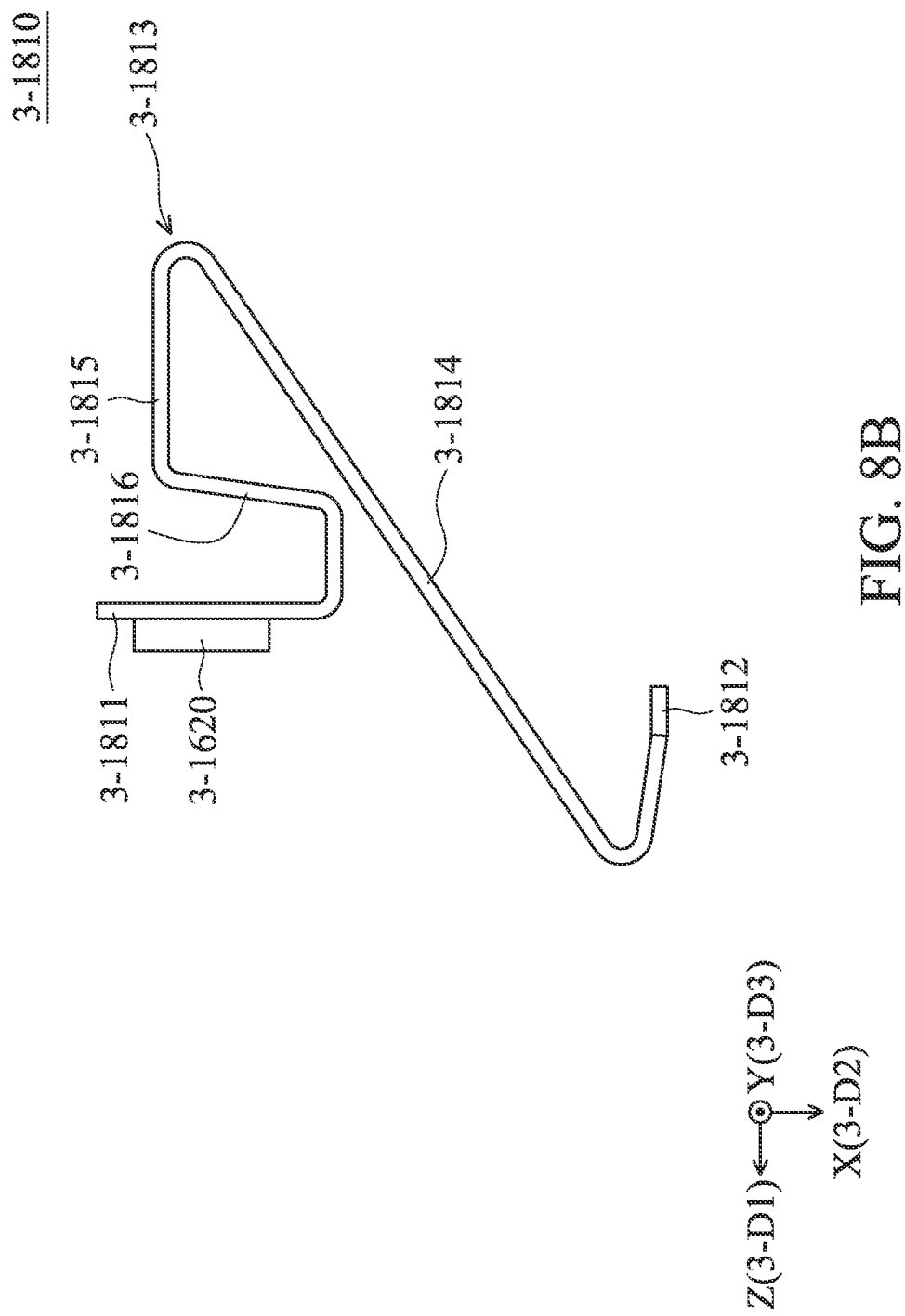
FIG. 8B shows a schematic view of the circuit assembly of the optical system in the second terminal position, according to some embodiments of the present disclosure.

Referring to FIGS. 7, 8A, and 8B, FIGS. 8A and 8B show schematic views of the first circuit element 3-1810 of the circuit assembly 3-1800 of the optical system 3-10 in the first terminal position and the second terminal position, respectively, according to some embodiments of the present disclosure. Since both the first movable portion 3-300 and the second movable portion 3-400 are movable relative to the fixed portion 3-900, the first circuit element 3-1810 may deform accordingly during the movements. When the first movable portion 3-300 is in an initial position (the position shown in FIG. 7) relative to the fixed portion 3-900, and viewed in the second direction 3-D2, the first section 3-1814 does not overlap the movable end 3-1811; the first section 3-1814 at least partially overlaps the fixed end 3-1812; the second section 3-1815 does not overlap the movable end 3-1811; and the second section 3-1815 at least partially overlaps the fixed end 3-1812. When the first movable portion 3-300 is in the first terminal position (the position shown in FIG. 8A) relative to the fixed portion 3-900, and viewed in the second direction 3-D2, the first section 3-1814 does not overlap the movable end 3-1811; the first section 3-1814 does not overlap the fixed end 3-1812; the second section 3-1815 does not overlap the movable end 3-1811; and the second section 3-1815 does not overlap the fixed end 3-1812. When the first movable portion 3-300 is in the second terminal position (the position shown in FIG. 8B) relative to the fixed portion 3-900, and viewed in the second direction 3-D2, the first section 3-1814 at least partially overlaps the movable end 3-1811; the first section 3-1814 at least partially overlaps the fixed end 3-1812; the second section 3-1815 does not overlap the movable end 3-1811; and the second section 3-1815 does not overlap the fixed end 3-1812.

It should be understood that the first movable portion 3-300 and the second movable portion 3-400 that are described in the present disclosure are interchangeable. That is, in some alternative embodiments, the elements that are connected to the first movable portion 3-300 herein may be connected to the alternative second movable portion 3-400, while the elements that are connected to the second movable portion 3-400 herein may be connected to the alternative first movable portion 3-300. As long as the relative motion between the first movable portion 3-300 and the second movable portion 3-400 are fulfilled, those embodiments are included in the scope of the present disclosure.

In summary, the optical system 3-10 of the present disclosure includes a plurality of optical elements (e.g. the first optical element 3-100 and the second optical element 3-200). A plurality of driving assemblies (e.g. the first driving assembly 3-700 and the second driving assembly 3-800) are used to drive the optical elements to move relative to the fixed portion 3-900 and; relative to each other, achieving effects of optical zooming or optical focusing, or the like. A plurality of sensing assemblies (e.g. the first sensing assembly; 3-1500 and the second sensing assembly 3-1600) are used to precisely control the positions of the optical elements. Additionally, a flexible circuit assembly (e.g. the first circuit element 3-1810) is provided to connect the movable portion that holds the optical element and the fixed portion, which is helpful for achieving further miniaturization of the mechanism.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
a first movable portion connected to a first optical element;
a fixed portion, wherein the movable portion is movable relative to the fixed portion;
a first driving assembly driving the first movable portion to move relative to the fixed portion;
a circuit assembly, wherein the first movable portion is movably connected to the fixed portion via the circuit assembly;
a second movable portion connected to a second optical element, wherein the second movable portion is movable relative to the fixed portion and the first movable portion, wherein the first movable portion and the second movable portion are arranged in a first direction; and
a second driving assembly driving the second movable portion to move relative to the fixed portion,
wherein the circuit assembly comprises:
a first circuit element connecting the first movable portion and the fixed portion, comprising:
a movable end, fixedly connected to the first movable portion;
a fixed end, fixedly connected to the fixed portion; and
a flexible portion, wherein the movable end is movably connected to the fixed end via the flexible portion.

2. The optical system as claimed in claim 1,
wherein the first movable portion is movable within a first range of motion relative to the fixed portion;
wherein the second movable portion is movable within a second range of motion relative to the fixed portion, wherein the second range of motion is different from the first range of motion; and
wherein the second movable portion is movable within a third range of motion relative to the first movable portion.

3. The optical system as claimed in claim 2, further comprising:
a first sensing assembly sensing the movement of the first movable portion relative to the fixed portion, comprising:
a first reference magnetic element, including a plurality of first magnetic pole pairs that have N poles and S poles, wherein the first magnetic pole pairs are arranged in the first direction, and in each of the first magnetic pole pairs, an N pole and an S pole are arranged in a first magnetic pole direction, wherein the first magnetic pole direction is perpendicular to the first direction; and
a first sensor corresponding to the first reference magnetic element; and
a second sensing assembly sensing the movement of the second movable portion relative to the first movable portion, comprising:
a second reference magnetic element, including a second magnetic pole pair that has an N pole and an S pole, wherein in the second magnetic pole pair, the N pole and the S pole are arranged in a second magnetic pole direction, wherein the second magnetic pole direction is parallel to the first direction; and a second sensor, corresponding to the second reference magnetic element, and disposed on the circuit assembly.

4. The optical system as claimed in claim 3, wherein in the first direction, the largest size of the second reference magnetic element is smaller than the largest size of the first reference magnetic element.

5. The optical system as claimed in claim 3, wherein the first magnetic pole direction is perpendicular to the second magnetic pole direction.

6. The optical system as claimed in claim 3, wherein when viewed in a second direction that is perpendicular to the first direction, the first reference magnetic element at least partially overlaps the second reference magnetic element, and the first sensor does not overlap the second sensor.

7. The optical system as claimed in claim 3, further comprising a control unit, wherein the control unit has first predetermined information and second predetermined information;
wherein the first predetermined information includes the status of a first magnetic field of the first reference magnetic element for each possible location of the first movable portion relative to the fixed portion; and
wherein the second predetermined information includes the status of a second magnetic field of the second reference magnetic element for each possible location of the second movable portion relative to the first movable portion; and
wherein the control unit is electrically connected to the first sensor and the second sensor via the circuit assembly, wherein the first sensor outputs a first sensing signal to the control unit, and the second sensor outputs a second sensing signal to the control unit.

8. The optical system as claimed in claim 7, wherein the control unit calculates the position of the first movable portion relative to the fixed portion based on the first sensing signal and the first predetermined information, and calculates the position of the second movable portion relative to the first movable portion based on the second sensing signal and the second predetermined information.

9. The optical system as claimed in claim 7, further comprising a third optical element, fixedly disposed at the fixed portion, and forming an optical unit with the first optical element and the second optical element;
wherein the control unit outputs a first driving signal to the first driving assembly based on a first instruction, and the first driving assembly drives the first movable portion to move, and changes the focal length of the optical unit, thereby performing the function of zooming; and
wherein the control unit outputs a second driving signal to the second driving assembly based on a second instruction, and the second driving assembly drives the second movable portion to move, and changes the image plane of the optical unit, thereby performing the function of focusing.

10. The optical system as claimed in claim 9, wherein the control unit outputs the first driving signal to the first driving assembly that drives the first movable portion to move before the control unit outputs the second driving signal to the second driving assembly that drives the second movable portion to move, so that the optical system performs the function of zooming before performing the function of focusing.

11. The optical system as claimed in claim 1, wherein the flexible portion has a plate structure.

12. The optical system as claimed in claim 11, wherein the flexible portion comprises:
a first section extending in a fourth direction;
a second section extending in a fifth direction; and
a third section extending in a sixth direction;
wherein:
the fourth direction is not parallel to the fifth direction;
the fifth direction is not parallel to the sixth direction; and
the sixth direction is not parallel to the fourth direction.

13. The optical system as claimed in claim 12, wherein when the first movable portion is in an initial position relative to the fixed portion, and viewed in a second direction that is perpendicular to the first direction,
the first section does not overlap the movable end; and
the first section at least partially overlaps the fixed end.

14. The optical system as claimed in claim 13, wherein:
the second section does not overlap the movable end; and
the second section at least partially overlaps the fixed end.

15. The optical system as claimed in claim 12, wherein when the first movable portion is in a first terminal position relative to the fixed portion, and viewed in a second direction that is perpendicular to the first direction,
the first section does not overlap the movable end; and
the first section does not overlap the fixed end.

16. The optical system as claimed in claim 15, wherein the second section does not overlap the movable end; and
the second section does not overlap the fixed end.

17. The optical system as claimed in claim 12, wherein when the first movable portion is in a second terminal position relative to the fixed portion, and viewed in a second direction that is perpendicular to the first direction,
the first section at least partially overlaps the movable end; and
the first section at least partially overlaps the fixed end.

18. The optical system as claimed in claim 17, wherein the second section does not overlap the movable end; and
the second section does not overlap the fixed end.

* * * * *